Figure 1:
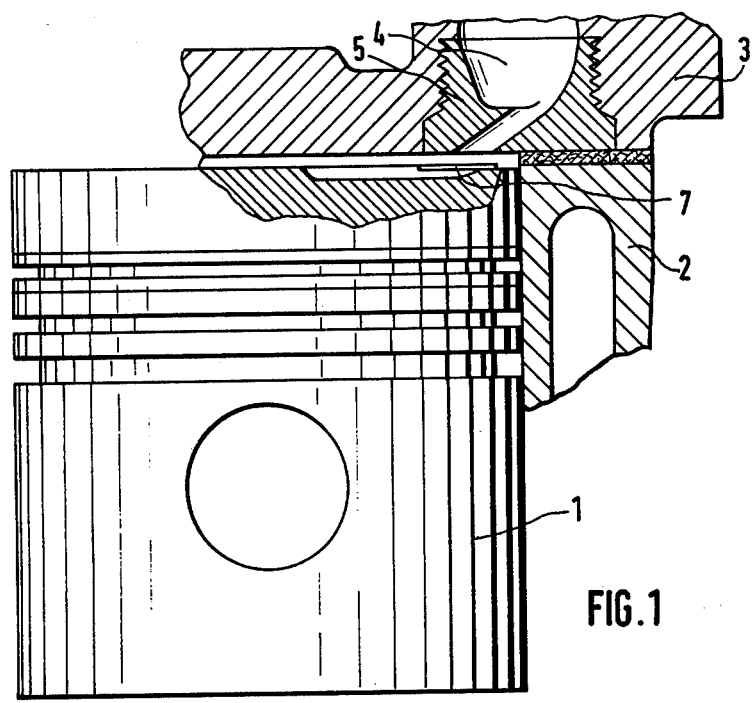

United States Patent [19]
Schlotterbeck

[11] 4,207,844
[45] Jun. 17, 1980

[54] PISTON

[75] Inventor: Manfred Schlotterbeck, Stuttgart, Fed. Rep. of Germany

[73] Assignee: Mahle GmbH, Fed. Rep. of Germany

[21] Appl. No.: 875,955

[22] Filed: Feb. 8, 1978

[30] Foreign Application Priority Data

Feb. 26, 1977 [DE] Fed. Rep. of Germany ....... 2708463

[51] Int. Cl.² .............................................. F02B 3/00
[52] U.S. Cl. .............................. 123/32 B; 123/193 P; 123/32 K
[58] Field of Search ................. 123/32 A, 32 B, 32 C, 123/32 K, 193 P

[56] References Cited

U.S. PATENT DOCUMENTS

| 2,741,229 | 4/1956 | Stump | 123/32 C |
| 2,935,054 | 5/1960 | Franke | 123/32 B |
| 3,044,454 | 7/1962 | Suhon | 123/32 B |
| 4,122,805 | 10/1978 | Kingsbury et al. | 123/32 C |

FOREIGN PATENT DOCUMENTS

| 52049 | 5/1935 | Denmark | 123/32 A |
| 2659100 | 6/1978 | Fed. Rep. of Germany | 123/32 C |

Primary Examiner—Ronald B. Cox
Attorney, Agent, or Firm—William A. Drucker

[57] ABSTRACT

A piston having an uncooled annular insert adjoining a main combustion chamber between piston and cylinder cover, combustion cavities arranged in the crown of the piston and an injection passage opening into the combustion cavities wherein, in the zones covered by the annular insert (5), laterally of the injection passage (8), outside the combustion cavities (6), the distance between the lower edge of the annular insert (5) and the crown surface of the piston (1) is increased by 0.15 to 0.7% of the piston diameter in comparison with the distance between the main surfaces of piston (1) and the cover of the cylinder (2).

4 Claims, 2 Drawing Figures

PISTON

The invention relates to a light metal piston for turbulence chamber diesel engines, in which the turbulence chamber arranged in the cylinder head comprises an uncooled annular insert at least partially adjoining the main combustion chamber between piston and cylinder cover, through which the fuel-air mixture from the turbulence chamber enters the main combustion chamber, and in which in the crown of the piston there are arranged combustion cavities into which there opens a shallow injection passage directed towards the opening of the turbulence chamber insert, the zones laterally of the injection passage being covered by a part of the annular insert of the turbulence chamber.

In pistons of this kind, in engine operation, material damage including for example material removal and cracks easily occurs on the edges of the injection passage. This damage is conjecturally based firstly upon a possible thermal overloading in this zone, and also upon coke deposits on the annular insert. The problem of the present invention is to provide a remedy here. This is solved in that in the zones of the piston covered by the annular insert, laterally of the injection passage, outside the combustion cavities the distance between the lower edge of the annular insert and the upper surface of the piston crown is increased in comparison with the distance between the main surfaces of piston and cylinder by 0.15–0.7%, preferably 0.15–0.5%, of the piston diameter.

With regard to smoke behaviour and fuel consumption, the best result is obtained with an increase of distance of 0.3–0.4% of the piston diameter in comparison with a crown not set back in the zone adjacent to the injection passage.

The increase of distance is most expediently achieved by a recess in the relevant crown zone of the piston, that is in the zones beside the injection passage.

Figure 2:
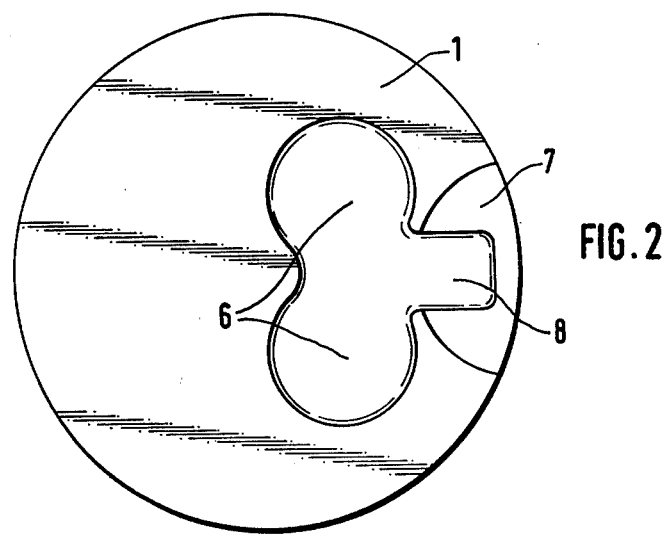

An example of embodiment of the invention is illustrated in the drawing, wherein:

FIG. 1 shows an elevation of the piston with section through the turbulence chamber and cylinder head, as partial elevation, FIG. 2 shows a plan view of the piston crown.

1, 2, 3, 4 designate piston 1, cylinder 2, cylinder head 3 and turbulence chamber 4 in the cylinder head. The connection between turbulence chamber 4 and main combustion chamber is formed by an uncooled annular insert 5. The material of the annular insert is cast iron with good high-temperature characteristics. The piston 1 is of the material Al Si12 CuMgNi and comprises combustion cavities 6 into which combustion air and fuel pass from the insert 5 of the turbulence chamber 4 through an injection passage 7. The lateral zones 7 around the injection passage 8 outside the combustion cavities, where they are covered by the annular insert 5, are set back in relation to the remainder of the piston crown surface by 0.3 mm. With a piston diameter of 90 mm., this amounts to 0.33% of the piston diameter. The size of the set back area is selected so that it still protrudes about 2 mm laterally beyond the annular insert.

In the piston as described, the material damage in the zone of the injection passage, the avoidance of which was the problem, in fact no longer occurred in operation.

I claim:

1. Light metal piston for turbulence chamber diesel engines, in which the turbulence chamber arranged in the cylinder head comprises an uncooled annular insert at least partially adjoining the main combustion chamber between piston and cylinder cover, through which the fuel-air mixture from the turbulence chamber enters the main combustion chamber and in which combustion cavities are arranged in the crown of the piston, into which there opens a shallow injection passage oriented to the opening of the combustion chamber insert, the zones laterally of the injection passage being covered by a part of the annular insert of the turbulence chamber, characterised in that in these zones covered by the annular insert (5), laterally of the injection passage (8), outside the combustion cavities (6), the distance between the lower edge of the annular insert (5) and the crown surface of the piston (1) is increased by 0.15 to 0.7% of the piston diameter in comparison with the distance between the main surfaces of piston (1) and the cover of the cylinder (2).

2. Light metal piston according to claim 1, characterised in that the increase of distance amounts to 0.15 to 0.5% of the piston diameter.

3. Light metal piston according to claim 2, characterised in that the increase of distance amounts to 0.3 to 0.4% of the piston diameter.

4. Light metal piston according to claim 1, characterised in that the increase of distance is effected by a recess in the relevant crown zone of the piston (1).

* * * * *